(12) United States Patent
Boyle et al.

(10) Patent No.: US 8,945,357 B2
(45) Date of Patent: Feb. 3, 2015

(54) WASTEWATER TREATMENT APPARATUS

(75) Inventors: Randall J. Boyle, Ladysmith (CA);
Randall C. Deluca, Ladysmith (CA)

(73) Assignee: Boydel Wastewater Technologies Inc., BC (CA)

( * ) Notice: Subject to any disclaimer, the term of this patent is extended or adjusted under 35 U.S.C. 154(b) by 780 days.

(21) Appl. No.: 13/201,737

(22) PCT Filed: Feb. 24, 2009

(86) PCT No.: PCT/CA2009/000219
§ 371 (c)(1), (2), (4) Date: Aug. 16, 2011

(87) PCT Pub. No.: WO2010/096891
PCT Pub. Date: Sep. 2, 2010

(65) Prior Publication Data
US 2011/0297552 A1 Dec. 8, 2011

(51) Int. Cl.
| C02F 1/463 | (2006.01) |
| C02F 1/467 | (2006.01) |
| C02F 1/56  | (2006.01) |
| C02F 1/72  | (2006.01) |
| C02F 1/00  | (2006.01) |
| C02F 1/461 | (2006.01) |

(52) U.S. Cl.
CPC .............. *C02F 1/4672* (2013.01); *C02F 1/463* (2013.01); *C02F 1/56* (2013.01); *C02F 1/722* (2013.01); *C02F 2001/007* (2013.01); *C02F 2001/46123* (2013.01); *C02F 2001/46142* (2013.01); *C02F 2201/4614* (2013.01); *C02F 2209/05* (2013.01); *C02F 2209/06* (2013.01); *C02F 2209/40* (2013.01); *C02F 2209/42* (2013.01); *C02F 2305/023* (2013.01); *C02F 2305/026* (2013.01)
USPC ......................... 204/267; 204/269; 204/275.1

(58) Field of Classification Search
USPC ...................................... 204/267, 269, 275.1
See application file for complete search history.

(56) References Cited

U.S. PATENT DOCUMENTS

| 4,048,031 A | 9/1977 | Valanti |
| 4,338,178 A | 7/1982 | Efimov et al. |
| 4,349,431 A | 9/1982 | Axenko et al. |
| 4,414,091 A | 11/1983 | Axenko et al. |
| 4,728,403 A | 3/1988 | Renzler |
| 5,788,820 A | 8/1998 | Liu |
| 5,902,465 A | 5/1999 | Pang |

(Continued)

FOREIGN PATENT DOCUMENTS

| CA | 1114969 | 12/1981 |
| JP | 2004567876 | 9/2004 |
| RU | 1810305 | 4/1993 |
| SU | 1212966 | 2/1986 |

(Continued)

*Primary Examiner* — Arun S Phasge
(74) *Attorney, Agent, or Firm* — Wendy K. Marsh (57) ABSTRACT

An apparatus (20) for treating contaminated water has an electrocoagulation reactor (26) and a clarifier (30) to receive the effluent of the reactor. The reactor has a reaction vessel (48) having an inlet (58) and an outlet (62), a sacrificial anode (64), a rotatable cathode (68) and a non-sacrificial anode (66). A first gap (70) between the sacrificial anode and the cathode comprises a first water treatment zone. A second gap (74) between the cathode and the non-sacrificial anode comprises the second water treatment zone. The water flow path is from the inlet to the first treatment zone, then to the second treatment zone and then to the outlet. In the clarifier, the reactor effluent is separated into cleaned water and the contaminated sludge.

49 Claims, 9 Drawing Sheets

(56) References Cited

U.S. PATENT DOCUMENTS

| | | | |
|---|---|---|---|
| 5,948,273 | A | 9/1999 | Yoshida et al. |
| 6,099,703 | A | 8/2000 | Syversen et al. |
| 7,462,287 | B2 | 12/2008 | Berrak et al. |
| 8,500,989 | B2 * | 8/2013 | Wood et al. ............ 205/755 |
| 2002/0040855 | A1 | 4/2002 | Morkovsky et al. |
| 2008/0223731 | A1 | 9/2008 | Lee |

FOREIGN PATENT DOCUMENTS

| | | |
|---|---|---|
| SU | 857006 | 8/1986 |
| WO | WO 01/14258 | 3/2001 |
| WO | WO 03/059823 | 7/2003 |
| WO | WO 2004/056823 | 7/2004 |
| WO | WO 2008/009973 | 1/2008 |
| WO | WO 2009/005583 | 1/2009 |

* cited by examiner

WASTEWATER TREATMENT APPARATUS

TECHNICAL FIELD OF THE INVENTION

This invention relates to the treatment of wastewater, and in particular to an apparatus and method for treatment of contaminated water in an electrolytic cell.

BACKGROUND OF THE INVENTION

Water may be contaminated by organic and inorganic matter from various sources including domestic, municipal, industrial and agricultural sources. Contaminants may be in solution, colloidal or in suspension. Colloids, and in particular negatively-charged colloids, are often the predominant form in which water contaminants exist.

Electrocoagulation is an electrochemical method of treating water contaminated with various species in an electrocoagulation reactor having a cathode and a sacrificial anode. Supplying current to the electrodes causes the release of metal cations (usually iron or aluminum) from the sacrificial anode, and the formation of hydrogen gas at the cathode. Other chemical species may form which participate in a variety of processes that facilitate removal of contaminants from water.

The use of rotating electrodes has been proposed as one way to improve the remediation efficacy of systems using electrocoagulation. See, for example, Syversen et al., U.S. Pat. No. 6,099,703. Rotating the cathode helps to ensure even consumption of the sacrificial anode and inhibit fouling of the active surface of the cathode. However, despite developments in the art of electrocoagulation, most known electrocoagulation-based wastewater treatment systems are not capable of sufficient remediation of contaminated waters for subsequent release into the environment at an affordable cost or at the volumes necessary for full commercialization of large-scale treatment projects. The present invention provides improved apparatus and method for the bulk treatment of contaminated water.

SUMMARY OF THE INVENTION

The invention provides an electrocoagulation reactor having a reaction vessel with an inlet for inflow of water, an outlet for outflow of water, a sacrificial anode, a rotatable cathode and a non-sacrificial anode. A first gap between the sacrificial anode and the cathode comprises a first treatment zone that is downstream of the inlet. The sacrificial anode and the cathode are adapted to apply a first voltage across the first gap. A second gap between the non-sacrificial anode and the cathode provides a second treatment zone downstream of the first treatment zone. The non-sacrificial anode and the cathode are adapted to apply a second voltage across the second gap. The second voltage may be less than the first voltage. The flow path of water through the reaction vessel is from the inlet to the first treatment zone, then to the second treatment zone and then to the outlet.

The invention further provides a rotatable cathode for an electrocoagulation reactor. The cathode has an active face generally perpendicular to the axis of rotation of the cathode. The active face has a center and a periphery and surface features which define a plurality of water flow paths from the center to the periphery. The surface features may comprise channels or studs. The rotatable cathode may be employed in electrocoagulation reactors having a single treatment zone, and accordingly the invention provides an electrocoagulation reactor having a sacrificial anode, a rotatable cathode and a gap between the sacrificial anode and the cathode comprising a first treatment zone, the cathode having surface features which define a plurality of water flow paths through the gap.

The invention further provides a clarifier for receiving effluent from an electrocoagulation reactor. The clarifier has a cylindrical side wall, an upper wall, a conical bottom wall, a first outlet port in the upper wall connected to a first outlet conduit and a second outlet port in the bottom wall connected to a second outlet conduit. The clarifier has an inlet conduit extending into the clarifier having an opening within the clarifier that is larger in cross-sectional area than the inner cross-sectional area of the inlet conduit.

The invention further provides a method for treating contaminated water using an electrocoagulation reactor. A reactor is provided having a water inlet, a water outlet, a gap between a sacrificial anode and a rotating cathode comprising a first treatment zone, and a gap between the rotating cathode and a non-sacrificial anode comprising a second treatment zone. A first electrolyzing voltage is applied across the first treatment zone and a second electrolyzing voltage is applied across the second treatment zone. The water is caused to flow into the reactor from the inlet, through the first treatment zone, then through the second treatment zone, and then through the outlet.

These and other features of the invention will be apparent from the following description and drawings of the preferred embodiments.

DESCRIPTION OF THE PREFERRED EMBODIMENTS

Exemplary embodiments of the invention are described hereunder and are illustrated in the referenced figures of the drawings. These embodiments are to be considered as illustrative rather than restrictive. In the following description and drawings, corresponding and like parts are referred by the same reference characters.

Figure 1:
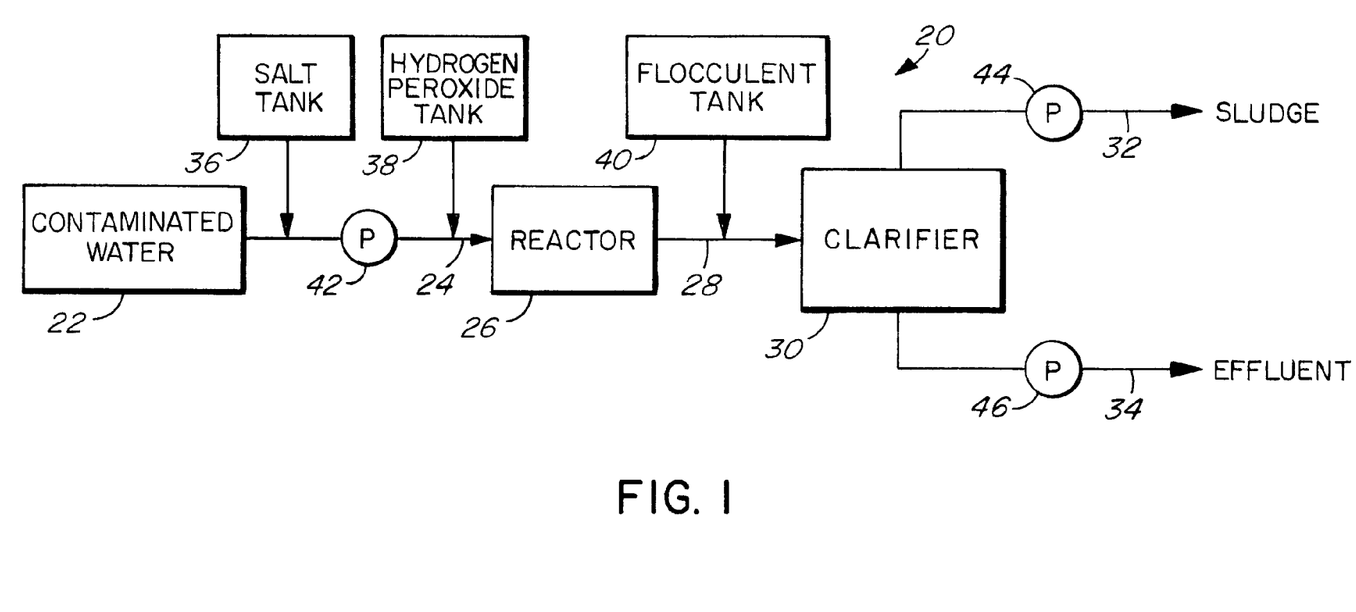
FIG. 1 is a schematic view of a treatment system according to the invention.

The treatment system 20 is illustrated schematically in FIG. 1. Contaminated water flows from a source 22 through a conduit 24 into an electrocoagulation reactor 26, the reactor having an electrolytic cell as described below. The effluent of the reactor flows through an outlet conduit 28 into a clarifier 30. An electrolyte, for example sodium chloride from a tank 36, and hydrogen peroxide from a tank 38, are added to the contaminated water in the conduit 24. Flocculant from a tank 40 is added to the reactor effluent in the conduit 28. In the clarifier 30, the effluent from the reactor 26 is separated into sludge, which exits the clarifier through an outlet conduit 32, and cleaned water, which exits the clarifier through another outlet conduit 34. Pumps 42, 44, 46 are provided in the conduits 24, 32 and 34 respectively.

The contaminated water that comprises the feedstock of the treatment system 20 is contaminated with organic contaminants, inorganic contaminants or both. The wastewaters may include municipal sewage, storm water, farm leachate, mine leachate, industrial, institutional and commercial wastewater. The contaminated water will typically have undergone some upstream processing such as screening to remove large particle contaminants. For example, in the case of municipal wastewater, the contaminated water will have undergone primary treatment such as screening, sedimentation and removal of sand and grit, prior to introducing it into the treatment system 20.

Figure 2A:
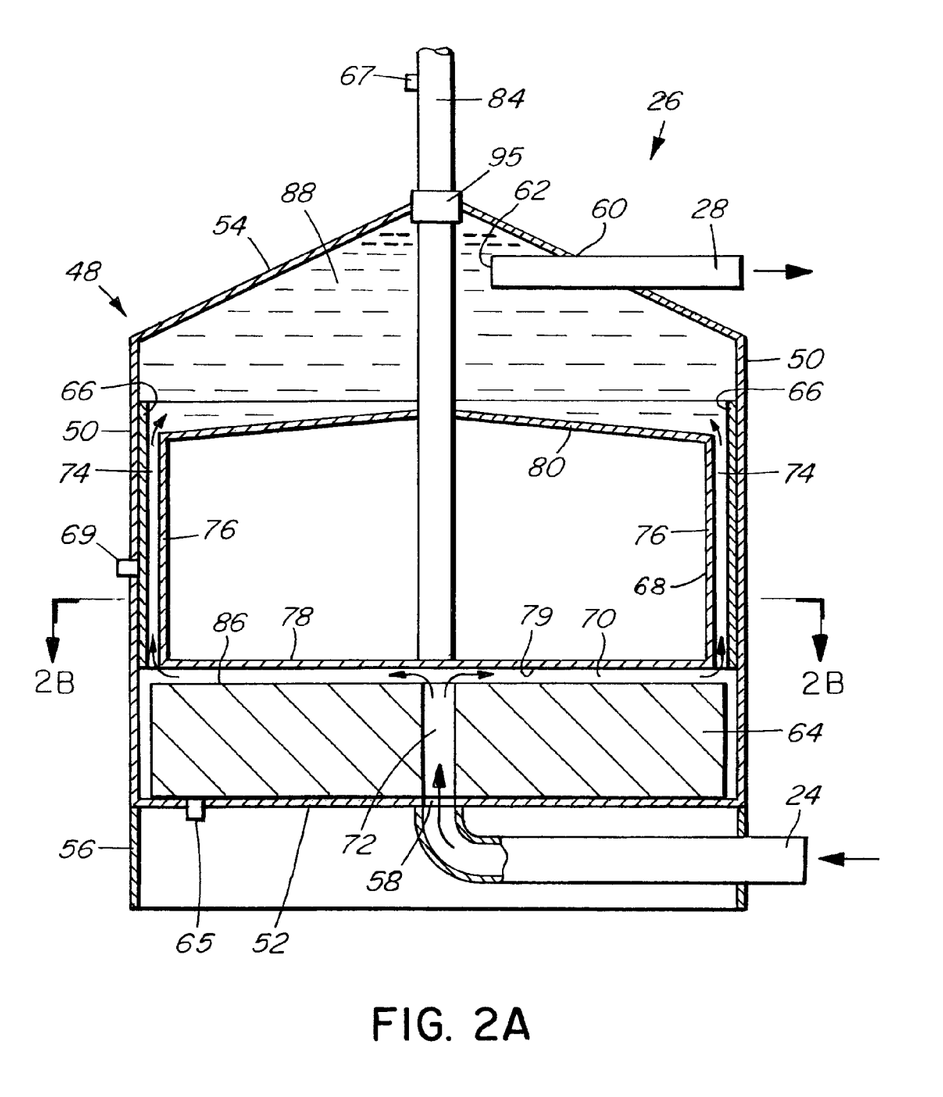
FIG. 2A and 2B are is an elevation view, partly in section, of one embodiment of the treatment reactor of the system.
Figure 2B:
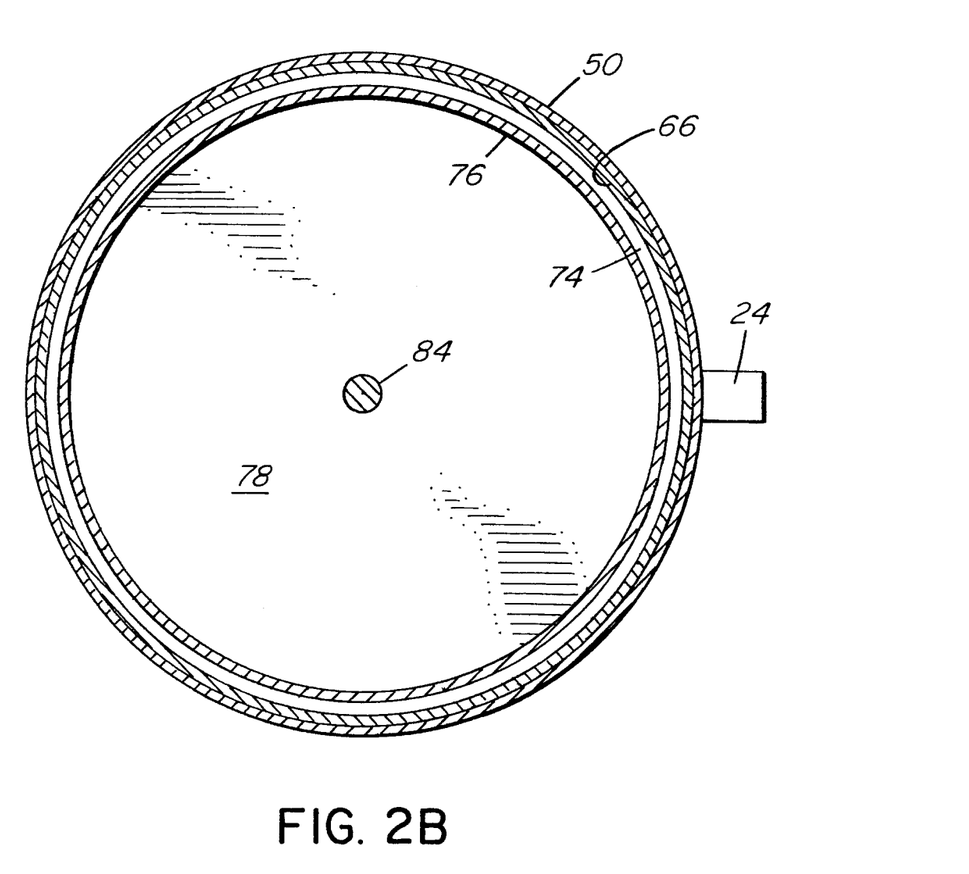

The reactor 26, shown in FIG. 2, has a housing 48 which is generally cylindrical, with a circumferential side wall 50 and a flat bottom wall 52, and with a conical upper wall 54. The housing 48 is supported on a base 56. The housing is made of an electrically non-conductive material, for example fiberglass. The bottom wall 52 of the reactor has an inlet port 58 for the inflow of contaminated water from the inlet conduit 24. The upper wall 54 has an outlet port 60 for the outflow of the effluent of the reactor 26. The outlet conduit 28 extends into the housing 48 through the outlet port 60, and has an opening 62 at its inner end.

The reactor 26 has a sacrificial anode 64, a non-sacrificial anode 66 and a rotatable cathode 68. The sacrificial anode 64 and the rotatable cathode are separated by a gap 70. The sacrificial anode 64 is attached to the bottom wall 52 of the reactor and does not rotate. It has a vertical bore 72 at its center, aligned with the inlet opening 58. The sacrificial anode 64 comprises a high valency metal such as iron or aluminum.

The non-sacrificial anode 66 is cylindrical in form and is attached to the inside of the side wall 50 of the housing 48. It is fixed in position and does not rotate. It comprises a suitable low valency metal, for example stainless steel or titanium, or ceramic, and may be coated with a coating which increases its active surface area, for example $TiO_2$. $TiO_2$ has high chemical durability and oxidizing strength and is particularly suitable. The non-sacrificial anode 66 is spaced from the cathode 68 by a gap 74. It is also spaced from the sacrificial anode 64; this space facilitates the periodic removal and replacement of the sacrificial anode and also permits the two anodes to be at different electrical potentials.

The cathode 68 is a sealed cylindrical structure having a circumferential side wall 76, a bottom wall 78 and a top wall 80. The cathode is made of a suitable low valency metal, for example stainless steel or titanium, or ceramic. The active surface of the cathode, namely the outer surface 79 of the bottom wall 78 and the outer surface of the side wall 76, may be coated with $TiO_2$. This coating promotes the formation of hydrogen peroxide from the hydrogen and oxygen generated during electrolysis in the reactor.

Figure 7A:
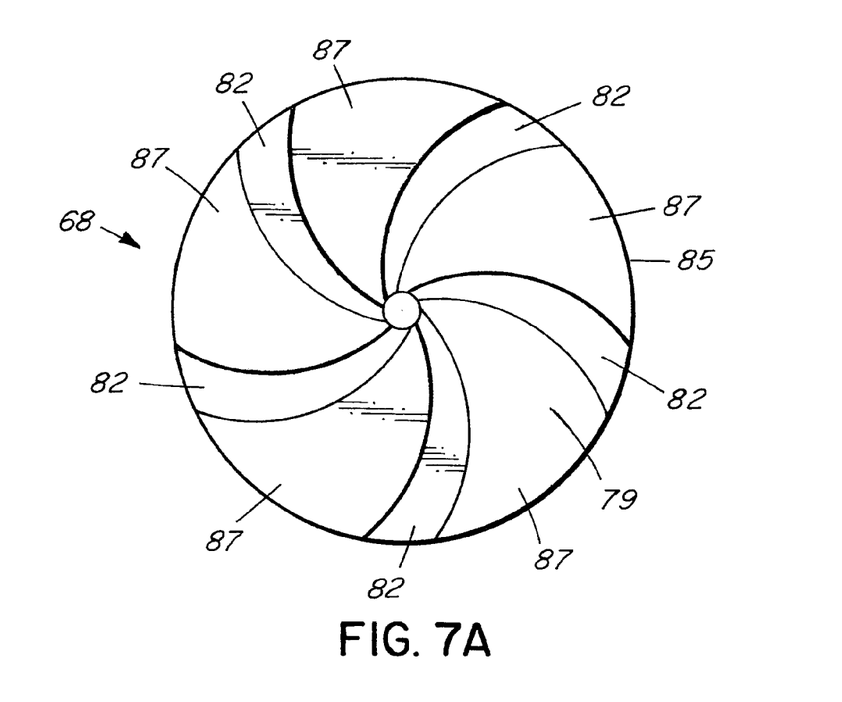
FIGS. 7A, 7B, 7C and 7D are plan views of the active surface of the reactor cathode, showing examples of features on the bottom face of the cathode.
Figure 7B:
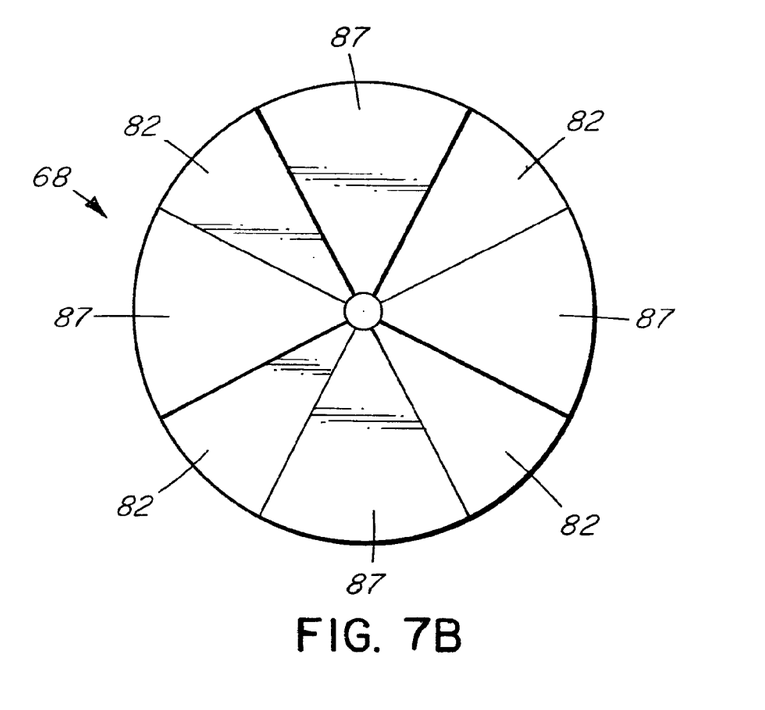
Figure 7C:
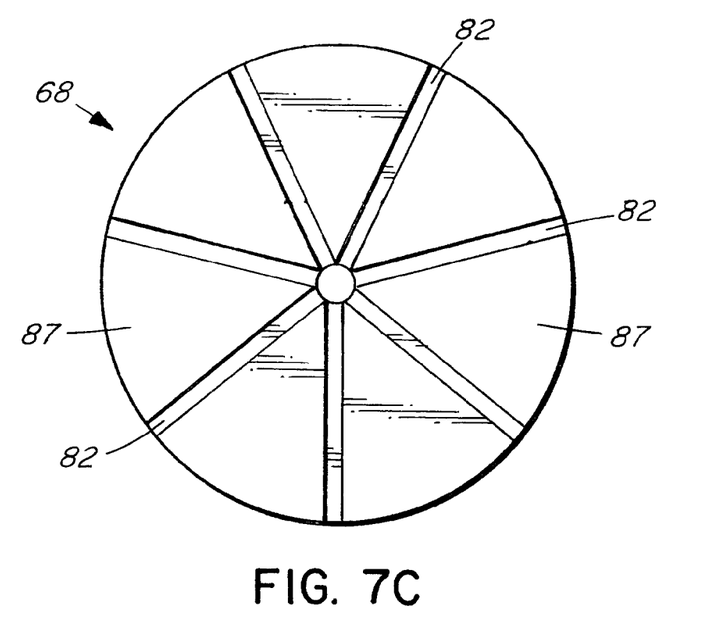

The outer surface 79 of the bottom wall 78 of the cathode may be provided with grooves 82 which act as channels to increase the flow rate of water moving radially outward in the gap 70. The grooves also direct radially outward the gas bubbles formed in the electrolysis reaction, along with the contaminants adsorbed by the bubbles. As shown in FIGS. 7A, B and C, the grooves may take various forms, including straight channels, tapered channels and spirals.

FIG. 7A shows channels 82 which extend from the center 83 to the periphery 85 of the outer surface of the bottom wall 78 of the cathode 68 in a spiral form. The channels are separated by lands 87. Alternatively, the channels 82 may extend straight from the middle of the cathode to its periphery without curving, and may be tapered, as illustrated in FIG. 7B, or untapered as illustrated in FIG. 7C. Different numbers of channels may be provided, for example from three channels to seven channels. They may be about one-half inch (13 mm) in depth. The depth, shape and number of channels may be selected so as to optimize the flow rate and inter-electrode spacing for a particular application.

Figure 7D:
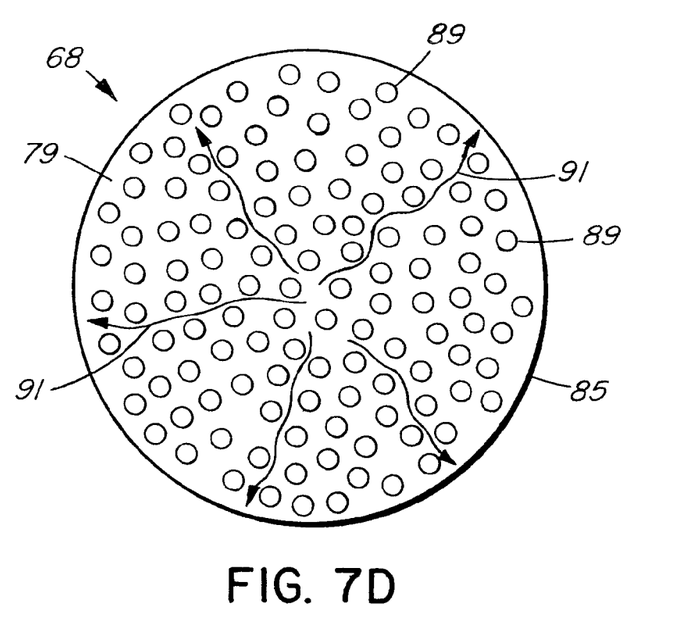

Surface features other than channels may be provided on the face of the cathode to produce particular flow characteristics. FIG. 7D shows a cathode face having a plurality of raised studs 89. The studs create irregular flow paths 91 between them for the water moving in the gap from the center to the periphery of the electrode face. The studs may be, for example, about one-inch (25 mm) in diameter and 3/16 inch (4.8 mm) in height, and made of stainless steel.

It will be understood that the feature of channels or studs on the face of a rotatable cathode has utility in electrocoagulation reactors other than the reactors described herein, including in prior art electrocoagulation reactors of the type having a rotatable cathode spaced from a sacrificial anode.

The cathode 68 is mounted for rotation on a shaft 84, which is connected to a motor or other suitable drive means (not shown). Rotation of the cathode reduces passivation of the active cathode surface. A bushing and seal assembly 95 surrounds the shaft 84 where the shaft passes through the upper wall 54 of the housing 48. The shaft 84 is further coupled to a suitable drive means (not shown) for vertical adjustment of the position of the cathode. This adjustability of the position of the cathode permits adjustment of the distance across the gap 70 during operation of the reactor in order to optimize the conditions for electrolysis of the feedstock. For example, changes in the turbidity of the feedstock may require adjustment of the gap distance. Vertical adjustment may be controlled manually or by sensors, for example sensors which monitor the electrical current across the gap 70.

In an industrial-scale electrocoagulation reactor, the cathode 68 may have a diameter of about 4 to 6 feet (1.2 to 1.8 m), a bottom wall thickness of 3/4 inch (19 mm) and a side wall thickness of 1/4 inch (6.4 mm). The distance across the gap 70 may be in the range of 1/8 to 1/2 inch (3.2 to 13 mm) and across the gap 74 in the range of 1/8 to 3/8 inch (3.2 to 9.5 mm). The rotation speed of the cathode may be in the range of 20 to 170 rpm and the flow rate of wastewater through the reactor in the range of 25 to 200 imperial gallons (114 to 909 L) per minute. Much larger electrocoagulation reactors, having a greater throughput, can also be made in accordance with the invention.

The electrical power supplied to the cathode 68, the sacrificial anode 64 and the non-sacrificial anode 66 can be DC, pulsed DC or high frequency AC. Power sources (not shown) are connected to the base of the sacrificial anode 64 at a terminal 65, to the non-sacrificial anode 66 at a terminal 69 and to the shaft 84 of the cathode at a terminal 67, the shaft being electrically conductive. The non-sacrificial anode 66 is typically maintained at a lower potential than the sacrificial anode 64 and has its own power supply, though for some feedstocks it may be maintained at the same potential or a higher potential. The selection of the type of electrical power used depends on the feedstock and the nature of the contaminants. For example, if the feedstock has a high level of organic contaminants, the preferred selection may be DC current to the sacrificial anode and high frequency AC to the non-sacrificial anode; or if the feedstock is one requiring a lower level of iron ions in solution, the selection may be pulsed DC for the sacrificial anode and high frequency AC for the non-sacrificial anode. Typical voltages/currents are about 6.5 V at 900 A and 7.5 V at 3,000 A.

Prior to treatment in the reactor 26, an electrolyte, such as sodium chloride, may be added to the contaminated water to increase its conductivity. Also, hydrogen peroxide may optionally be added to the feedstock. Generally, hydrogen peroxide is useful where the contaminants are organic, and a higher level of hydrogen peroxide may be used for higher levels of organic contaminants. The pH of the contaminated water may also be adjusted prior to the reactor if required, a pH range of about 3.5 to 7 being preferred.

In the reactor 26, the contaminated water flows in through inlet port 58, through the bore 72 in the sacrificial anode 64 and radially outward in the gap 70 between the active surface 86 of the anode 64 and the bottom surface of the rotating cathode 68. In this space, which is the first reaction zone of the reactor 26, iron cations go into solution as the active surface of the sacrificial anode is consumed, chemical reactions occur and contaminants are electrocoagulated. From the first reaction zone, the contaminated water flows into the gap 74 between the non-sacrificial anode 66 and the side wall 76 of the cathode. In this space, which is the second reaction zone of the reactor 26, it is believed that further oxidation of contaminants occurs by means of various reactions including Fenton reactions, ferrous ions ($Fe^{2+}$) and hydrogen peroxide both being present, resulting in the formation of hydroxyl radical oxidants.

The contaminated water flows from the second reaction zone into the space 88 between the top wall 80 of the cathode and the upper wall 54 of the housing. It then flows into the opening 62 of the discharge conduit 28, exiting the reactor.

Following treatment of the contaminated water in the reactor, effecting coagulation of solids and oxidation of contaminants, including bacterial contaminants, the effluent is treated to separate the coagulated solids from the water. Various types of downstream processes can be used to achieve this separation, for example a dissolved air flotation system or a separating tank with a skimmer to remove solids. In the preferred embodiment of the invention, the effluent from the reactor 26 is fed to a clarifier 30, shown in FIG. 6.

A flocculant from a tank 40 is fed into the effluent in conduit 28 prior to the effluent being fed into the clarifier. The type and concentration of flocculant employed depends on the particular wastewater feedstock.

Figure 6:
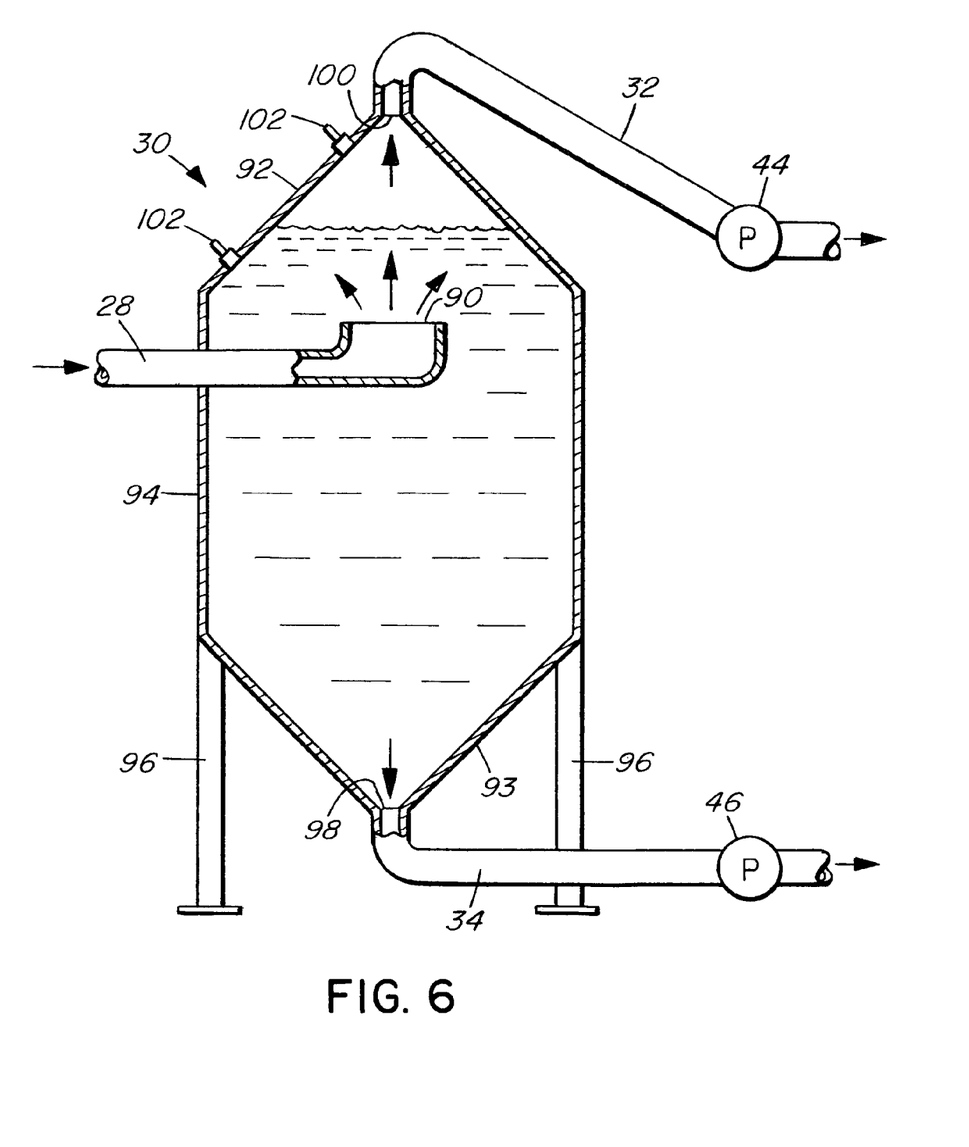
FIG. 6 is an elevation view, partly in section, of the clarifier of the treatment system.

Inside the clarifier 30, the conduit 28 has an outlet opening 90 that is oriented upwards and has a diameter larger than the diameter of the inside of the conduit 28. This slows the flow rate of effluent into the clarifier per unit area of the opening 90 to reduce turbulence.

The clarifier 30 has a generally cylindrical tank body with a conical top wall 92 and a conical bottom wall 93. The volume of the clarifier is sufficient, relative to the inflow rate of reactor effluent, that the retention time in the clarifier is adequate to achieve separation of the solids from the water. For example, the retention time may be about 5 to 8 minutes. The top wall 92 forms an angle at its point of juncture with the cylindrical side wall 94 that is about 60° (relative to the horizontal). The clarifier is supported on legs 96. There is an outlet port 98 at the bottom end of the clarifier, connected to the effluent outlet conduit 34. The conduit is provided with an effluent pump 46. There is an outlet port 100 at the upper end of the clarifier, connected to the sludge outlet conduit 32. The conduit 32 is provided with a sludge pump 44. A pair of vertically-spaced level sensors 102 are provided in the upper wall 92 of the clarifier, to detect the level of water and sludge. The effluent pump 46 regulates the water level through input from these sensors.

The pumps 44, 46 operate so as to create a partial vacuum within the clarifier, for example a pressure in the range of 5 to 25 kPa. By means of the conduit 28 connecting the reactor 26 to the clarifier 30, this partial vacuum is also applied to the full reactor system. It is believed that the treatment process in the reactor system is enhanced by such partial vacuum.

The partial vacuum within the clarifier enhances the separation of the flocculated solids, which rise to the top of the clarifier, and the water, which descends to the bottom of the clarifier. The solids comprise a sludge which exits the top of the tank through the outlet 100 and is pumped by the sludge pump 44 through the outlet conduit 32. The cleaned water, separated from the sludge, exits the bottom of the tank through the outlet 98 and is pumped by the effluent pump 46 through the outlet conduit 34. The cleaned water may be released to the environment or subjected to further treatment, for example pH adjustment, prior to release. A portion of the cleaned water exiting through the outlet conduit 34 may be recirculated via a recirculation conduit (not shown) into the reactor inlet conduit 24 for further treatment in the system 20.

In an alternative mode of operation of the clarifier 30, a coagulant, rather than a flocculant, is fed into the reactor effluent in the conduit 28 prior to the effluent being fed into the clarifier. The coagulant causes separated solids to sink to the bottom of the clarifier rather than float to the top (as occurs with a flocculant). This mode of operation may be used when treating feedstocks having contaminants with naturally negative buoyancy, for example heavy metals. The upper outlet conduit 32 accordingly removes the cleaned water from the clarifier and the lower outlet conduit 34 removes the sludge. The pumps 44 and 46 are switched so that the upper outlet conduit 32 has an effluent pump and the lower outlet conduit 34 has a sludge pump; and the level sensors 102 are moved to the bottom wall 93. The opening 90 of the conduit 28 may be directed downwards.

It will be understood that the clarifier 30 (arranged to operate in either of the two modes of operation) may be connected to receive the effluent of other types of electrocoagulation reactor, for example prior art reactors.

The treatment system may be operated by means of a programable logic computer (PLC), with appropriate devices to measure and control fluid flows throughout the apparatus, electrical current across the inter-electrode gaps, conductivity and pH of the feedstock, pump speeds, fluid levels in the clarifier, and so on. The process is to be run so as to produce cleaned effluent water meeting the requirements for a particular application.

Figure 3:
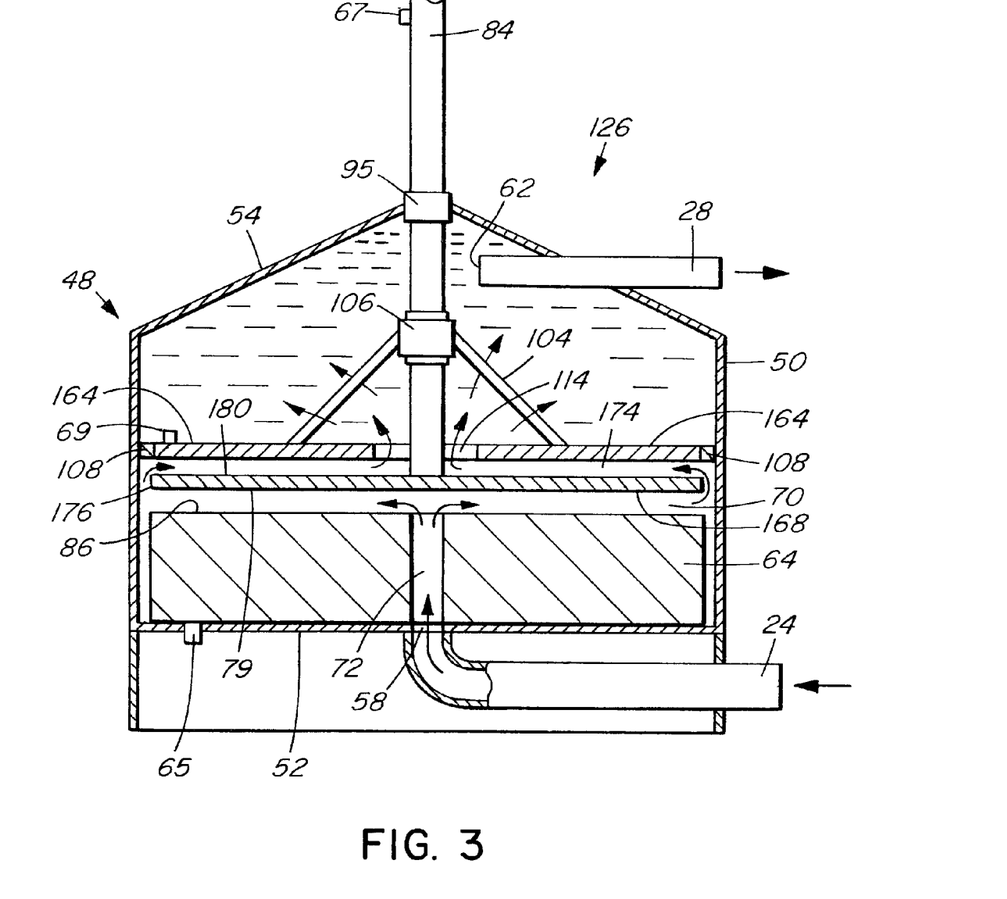
FIG. 3 is an elevation view, partly in section, of a second embodiment of the treatment reactor.

In another embodiment 126 of the reactor, illustrated in FIG. 3, the non-sacrificial anode is positioned horizontally above the cathode and is moveable vertically with it as the cathode is moved to adjust the gap between it and the sacrificial anode. The reactor 126 is otherwise substantially the same as the reactor 26. More particularly, the reactor 126 has a rotatable cathode 168 that comprises a flat plate, and a non-sacrificial anode 164 that comprises a flat plate, spaced from the upper surface 180 of the cathode 168 by a gap 174. The non-sacrificial anode 164 does not rotate and is supported by support members 104 affixed to a collar and bearing assembly 106. The collar and bearing assembly 106 permits rotation of the cathode shaft relative to the non-sacrificial anode 164, which maintains a fixed vertical position on the shaft 84, so that the non-sacrificial anode 164 (and the collar and bearing assembly 106) moves vertically with the cathode. The collar and bearing assembly 106 is electrically insulated from the cathode shaft 84. A seal 108 extends the periphery of the non-sacrificial anode and the side wall 50 of the reactor housing, preventing the flow of water therebetween. The active surface 86 of the sacrificial anode 64 is spaced from the lower side of the cathode by a gap 70, this gap comprising the first treatment zone of the reactor 126, the gap 174 comprising the second treatment zone. The treatment zones function in the manner described above for the two treatment zones of the reactor 26 of the first embodiment. As indicated by the directional arrows in FIG. 3, wastewater enters the reactor through the inlet port 58, flows through the bore 72 in the sacrificial anode 64 and into the first gap 70. It then flows radially outward in the gap 70, around the circumferential edge 176 of the cathode and into the second gap 174. It then flows through the central opening 114 in the non-sacrificial anode 164, into the space between the upper wall 54 of the housing 48 and the non-sacrificial anode 164, and then out through the effluent conduit 28.

Figure 4:
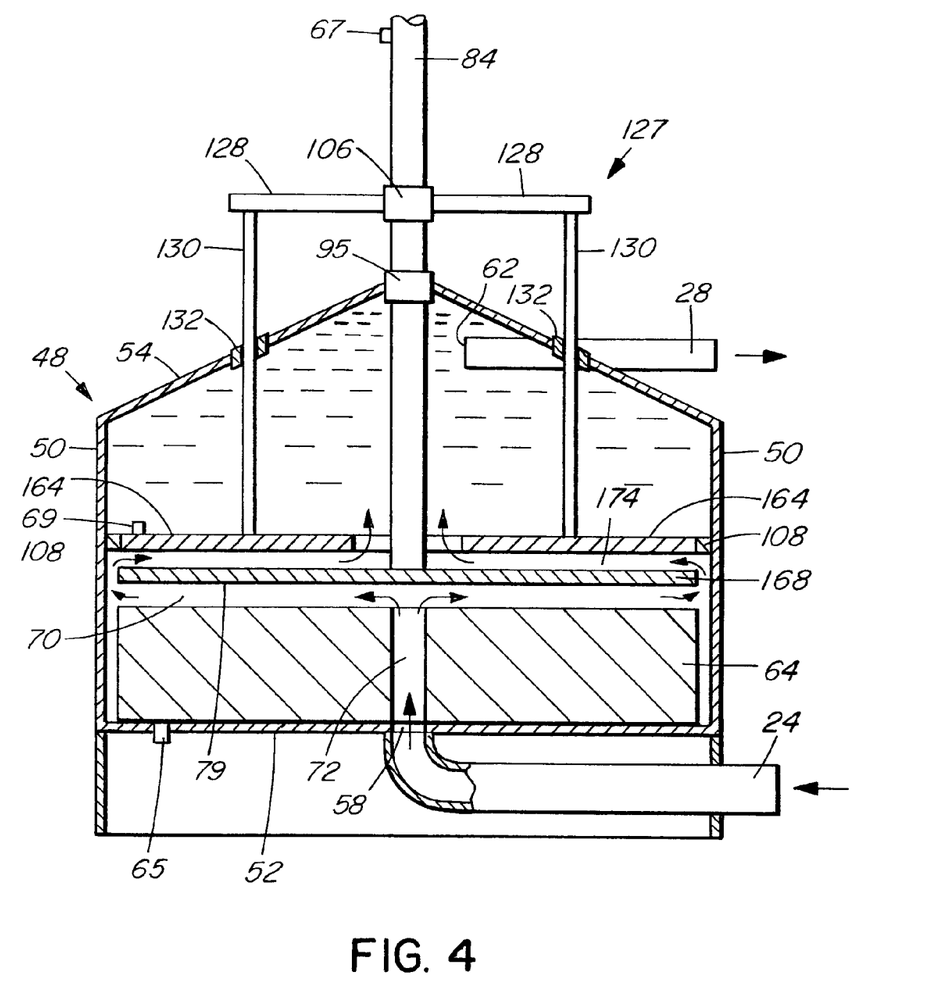
FIG. 4 is an elevation view, partly in section, of a third embodiment of the treatment reactor.

A third embodiment 127 of the reactor, illustrated in FIG. 4, is essentially the same as the reactor 126 of FIG. 3, except for the positioning of the collar and bearing assembly, which is outside the reactor, and the support members which connect the non-sacrificial anode 164 to the collar and bearing assembly. In reactor 127, the collar and bearing assembly 106 is on the shaft 84 of the cathode 168 outside and above the reactor housing 48. The assembly 106 has a pair horizontal support members 128, and a pair of vertical support members 130 connect the non-sacrificial anode 164 to a respective horizontal support member. The vertical support members 130 pass through ports in the upper wall 54 of the reactor housing, and a water seal 132 is fitted around the support member 130 at each port.

Figure 5:
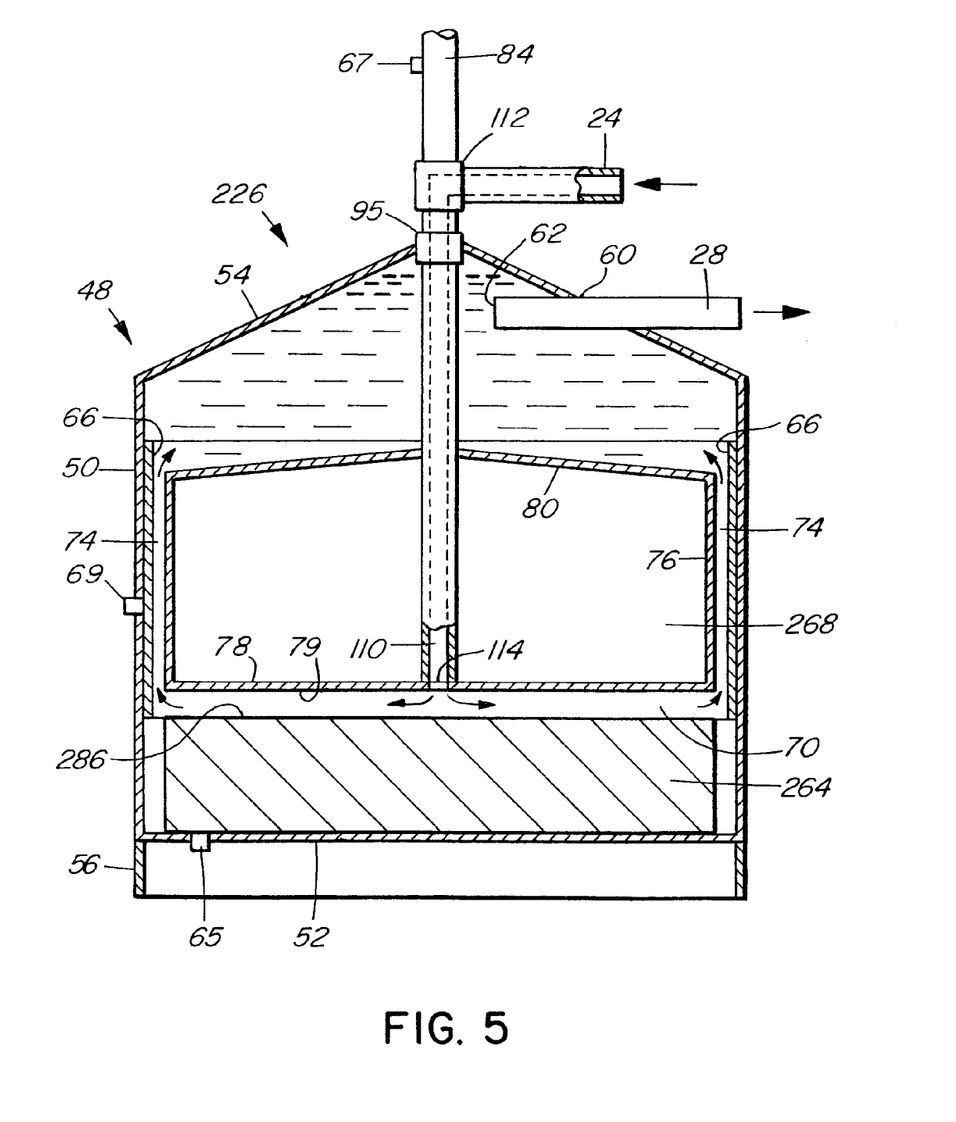
FIG. 5 is an elevation view, partly in section, of a fourth embodiment of the treatment reactor.

In a fourth embodiment 226 of the reactor, shown in FIG. 5, the wastewater inlet is through the rotatable cathode, rather than through the sacrificial anode. The reactor has a sacrificial anode 264 fastened to the bottom wall 52 of the reactor housing 48, a rotatable cathode 268 spaced from the upper, active surface 286 of the sacrificial anode 264 by a gap 70, and a cylindrical non-sacrificial anode 66 attached to the inside of the side wall 50 of the reactor housing 48, the non-sacrificial anode being spaced from the cathode 268 by a gap 74. The support shaft 84 of the cathode has a bore 110 therein and a bearing and seal unit 112, connected to a wastewater inlet pipe 24, permitting the flow of wastewater into the bore 110 and out through the opening 114 in the bottom wall 78 of the cathode and into the gap 70. The flow of wastewater in this embodiment of the reactor is radially outward through the gap 70, which comprises the first treatment zone, through the gap 74, which comprises the second treatment zone, and into the space between the upper wall 54 of the housing 48 and the top wall 80 of the cathode, and then out through the effluent conduit 28.

A fifth embodiment of the reactor, not separately illustrated in the drawings, is the same in structure as the reactor 26 shown in FIG. 2A, except it does not include the non-sacrificial anode or second treatment zone (or electrical terminal 69). The single treatment zone is defined by the gap 70 between the top surface 86 of the sacrificial anode 64 and the bottom surface 79 of the rotatable cathode 68. The water flow path in the reactor is in through the bore 72 in the sacrificial anode 64 to the gap 70, then through the gap 70 and around the periphery of the cathode, into the space 88 above the cathode and then out through the effluent conduit 28. The bottom face 79 of the cathode 68 of the reactor has surface features as described above and shown in FIG. 7, namely grooves 82 or raised studs 89 to produce particular water flow characteristics in the gap 70.

EXAMPLES

Samples of wastewaters were treated in a laboratory-scale apparatus in accordance with the invention. Various measurements were made of contaminants/parameters of the feedstock and the effluent and, in some cases, the sludge. The results are summarized below.

Example 1

A sample of municipal sewage was treated. The carbonaceous BOD of the feedstock was 169 mg/L and of the effluent was 20 mg/L. The total suspended solids of the effluent was 8 mg/L. The fecal coliform content of the effluent was less than the 1 colony per 100 ml detection limit of the test.

Example 2

Another sample of municipal sewage was treated. The test results are set out in Table 1.

TABLE 1

| Test | Feedstock | Effluent | Sludge |
|---|---|---|---|
| Fe (mg/L) | 0.15 | — | 3 |
| Total Solids (mg/L) | 180 | 16 | — |
| Total BOD (mg/L) | 270 | 40 | — |
| Fecal Coliform (colonies/100 ml) | 3 million | <100 | 2.4 million |

The marking — indicates that the parameter was not measured.

Example 3

Five 5-gallon samples of underground mine water were treated. Measurements were made of the level of various elements in the feedstock and in the treated effluent and, for Samples 4 and 5 in the sludge. The test results are shown in Tables 2 and 3. In a few cases, the metal content increased, for example for iron, manganese and sodium. This is due to additions of those elements from the sacrificial anode or by chemical dosing during the treatment process.

TABLE 2

| | Sample #1 | | Sample #2 | | Sample #3 | |
|---|---|---|---|---|---|---|
| Element | Feedstock | Effluent | Feedstock | Effluent | Feedstock | Effluent |
| Aluminum | 11 | 0.6 | 22 | 0.7 | 10 | 3 |
| Barium | 0.2 | 0.08 | 0.34 | 0.06 | 0.16 | 0.07 |
| Boron | 0.5 | 0.3 | 0.5 | 0.2 | 0.3 | 0.4 |
| Calcium | 1150 | 925 | 1300 | 928 | 916 | 667 |
| Cobalt | 1.5 | 0.6 | 2.1 | 0.5 | 1.3 | 0.4 |
| Copper | 35.1 | 1.2 | 80.2 | 1.2 | 34.9 | 7.6 |
| Iron | 114 | 26.3 | 279 | 26.5 | 91.4 | 138 |
| Magnesium | 74 | 57.3 | 88 | 56.6 | 63 | 40 |
| Manganese | 2.45 | 3.81 | 2.96 | 3.32 | 2.13 | 2.97 |
| Molybdenum | 0.4 | 0.2 | 0.4 | 0.2 | 0.4 | 0.4 |
| Nickel | 48.7 | 22.5 | 59.1 | 16.2 | 43.8 | 13.1 |
| Potassium | 86 | 74 | 95 | 74 | 72 | 46 |
| Silicon | 39 | 2.9 | 45 | 2.2 | 35 | 10 |
| Sodium | 475 | 549 | 509 | 402 | 392 | 318 |
| Strontium | 17.7 | 14.6 | 19.1 | 14.6 | 14.4 | 9.78 |
| Titanium | 0.6 | 0.05 | 1.6 | 0.05 | 0.6 | 0.1 |
| Zinc | 1.8 | 0.38 | 2.8 | 0.25 | 0.5 | 0.7 |

Measurements are in mg/L.

TABLE 3

|  | Sample #4 | | | Sample #5 | | |
| --- | --- | --- | --- | --- | --- | --- |
| Element | Feedstock | Effluent | Sludge | Feedstock | Effluent | Sludge |
| Aluminum | 2.6 | 0.01 | 3910 | 0.5 | <0.01 | 358 |
| Barium | 0.16 | 0.045 | 18 | 0.16 | 0.147 | 36 |
| Boron | <0.1 | 0.028 | <10 | 0.1 | 0.114 | 18 |
| Calcium | 278 | 229 | 13000 | 1020 | 815 | 42100 |
| Chromium | <0.1 | <0.001 | 90 | <0.1 | <0.001 | 30 |
| Cobalt | 0.2 | 0.083 | 163 | 0.2 | 0.0224 | 236 |
| Copper | 2.2 | 0.029 | 5730 | <0.2 | 0.0318 | 1030 |
| Iron | 0.4 | 1070 | 407000 | 0.4 | 10.4 | 384000 |
| Lead | <0.3 | <0.0002 | 103 | <0.3 | 0.0005 | 71 |
| Magnesium | 35.9 | 21.4 | 1720 | 99.9 | 87.1 | 4780 |
| Manganese | 1.14 | 1.28 | 2900 | 1.43 | 1.11 | 1360 |
| Molybdenum | <0.2 | 0.0008 | <20 | <0.2 | 0.0061 | <20 |
| Nickel | 8.8 | 2.95 | 6090 | 10.1 | 0.968 | 10200 |
| Potassium | 21 | 18.2 | 773 | <1.5 | 64.6 | 2550 |
| Silicon | 7.2 | 0.7 | 2260 | 70 | 0.9 | 387 |
| Sodium | 151 | 370 | 13700 | 484 | 421 | 17600 |
| Strontium | 0.96 | 0.923 | 65 | 13.6 | 12.3 | 690 |
| Titanium | <0.5 | <0.02 | 14 | <0.05 | <0.02 | 14 |
| Zinc | 0.42 | 0.021 | 566 | 0.3 | 0.008 | 510 |

Measurements are in mg/L.

LIST OF REFERENCE NUMERALS IN THE DRAWINGS 20 treatment system
22 source of contaminated water
24 conduit into reactor
26 reactor
28 conduit into clarifier
30 clarifier
32 sludge outlet conduit
34 effluent outlet conduit
36 salt tank
38 hydrogen peroxide tank
40 flocculant tank
42 feedstock pump
44 sludge pump
46 effluent pump
48 reactor housing
50 side wall of housing
52 bottom wall of housing
54 upper wall of housing
56 reactor base
58 reactor inlet
60 reactor outlet
62 opening in conduit 28
64 sacrificial anode
65 terminal on sacrificial anode
66 non-sacrificial anode
67 terminal on cathode
68 cathode
69 terminal on non-sacrificial anode
70 first gap
72 bore in sacrificial anode
74 second gap
76 side wall of cathode
78 bottom wall of cathode
79 bottom surface of cathode
80 top wall of cathode
82 grooves in cathode
83 center of cathode
84 shaft of cathode
85 periphery of cathode
86 active surface of sacrificial anode
87 lands of cathode face
88 space above cathode
89 studs on cathode face
90 inlet in clarifier
91 water flow paths
92 upper wall of clarifier
93 bottom wall of clarifier
94 side wall of clarifier
95 bushing and seal assembly
96 legs of clarifier
98 outlet for effluent
100 outlet for sludge
102 level sensors
104 support members
106 insulated collar and bearing assembly
108 seal on anode 164
110 bore in cathode shaft
112 bearing and seal unit
114 central opening in cathode shaft 84
126 second embodiment of reactor
127 third embodiment of reactor
128 horizontal support members
130 vertical support members
132 seal on vertical supports
164 non-sacrificial anode
168 cathode
174 second gap
176 periphery of cathode
226 fourth embodiment of reactor
264 sacrificial anode
268 cathode
286 active surface of sacrificial anode Although the invention has been described in terms of various embodiments, it is not intended that the invention be limited to these embodiments. Various modifications within the scope of the invention will be apparent to those skilled in the art. The scope of the invention is defined by the claims that follow.

What is claimed is:

1. An apparatus for treating contaminated water comprising:
   (a) an electrocoagulation reactor comprising:
      (i) a reaction vessel having an inlet for inflow of water and an outlet for outflow of water from the reaction vessel;
      (ii) a sacrificial anode;
      (iii) a rotatable cathode;
      (iv) a non-sacrificial anode;
      (v) a first gap between the sacrificial anode and the cathode, the first gap comprising a first treatment zone downstream of the inlet, the sacrificial anode and the cathode being adapted to apply a first voltage across the first gap;
      (vi) a second gap between the non-sacrificial anode and the cathode, the second gap comprising a second treatment zone downstream of the first treatment zone, the non-sacrificial anode and the cathode being adapted to apply a second voltage across the second gap, whereby a flow path of water through the reaction vessel is from the inlet to the first treatment zone, then to the second treatment zone and then to the outlet.

2. An apparatus according to claim 1, wherein the reaction vessel is cylindrical with a circumferential side wall, a bottom wall and a top wall.

3. An apparatus according to claim 2, wherein the inlet is through the bottom wall of the reaction vessel.

4. An apparatus according to claim 2, wherein the non-sacrificial anode is cylindrical and adjacent to the circumferential side wall.

5. An apparatus according to claim 2, wherein the non-sacrificial anode is a disk having an upper surface and a lower surface, the non-sacrificial anode extending between the circumferential side walls of the reaction vessel and having a bore therein for the flow of water.

6. An apparatus according to claim 2, wherein the top wall is conical.

7. An apparatus according to claim 2, wherein the outlet is in the top wall of the reaction vessel.

8. An apparatus according to claim 1, wherein the sacrificial anode has a bore therethrough for the flow of water from the inlet to the first treatment zone.

9. An apparatus according to claim 1, wherein the cathode is cylindrical with a bottom wall, a top wall and a circumferential side wall.

10. An apparatus according to claim 9, wherein the second gap is between the circumferential side wall of the cathode and the non-sacrificial anode.

11. An apparatus according to claim 1, wherein the first gap is between the upper surface of the sacrificial anode and the bottom surface of the cathode.

12. An apparatus according to claim 1, wherein the second reaction zone is between the upper surface of the cathode and the lower surface of the non-sacrificial anode.

13. An apparatus according to claim 1, wherein the cathode is rotatable on a shaft and the cathode and shaft have a bore therein for the flow of water into the first treatment zone.

14. An apparatus according to claim 1, wherein the sacrificial anode is non-rotational.

15. An apparatus according to claim 1, wherein the non-sacrificial anode is non-rotational.

16. An apparatus according to claim 1, further including a separator to receive effluent from the electrocoagulation reactor outlet to separate solids from clean water.

17. An apparatus according to claim 16, wherein the separator is a clarifier having a cylindrical side wall, an upper wall and a conical bottom wall.

18. An apparatus according to claim 17, wherein an inlet conduit in the clarifier has an opening larger in cross-sectional area than the inner cross-sectional area of the conduit.

19. An apparatus according to claim 18, wherein the inlet conduit opening in the clarifier is directed upwards.

20. An apparatus according to claim 17, wherein the clarifier has an upper outlet at its top end connected to an upper outlet conduit, and a lower outlet at its bottom end connected to a lower outlet conduit.

21. An apparatus according to claim 20, wherein the upper outlet is a solids outlet and the lower outlet is a cleaned water outlet.

22. An apparatus according to claim 20, wherein the upper outlet is a cleaned water outlet and the lower outlet is a solids outlet.

23. An apparatus according to claim 20, further comprising a first pump operationally connected to the upper outlet conduit and a second pump operatively connected to the lower outlet conduit.

24. An apparatus according to claim 17, further comprising water level sensors on the upper wall of the clarifier operatively connected to the water outlet pump.

25. An apparatus according to claim 1, wherein the rotatable cathode has an active face generally perpendicular to the axis of rotation of the cathode, the active face having a center and a periphery, the active face having surface features which define a plurality of water flow paths from the center to the periphery.

26. An apparatus according to claim 25, wherein the surface features comprise channels.

27. An apparatus according to claim 26, wherein the channels are curved or straight.

28. An apparatus according to claim 26, wherein the channels flare outwardly from the center of the face to the periphery thereof.

29. An apparatus according to claim 25, wherein the surface features comprise studs.

30. An apparatus according to claim 29, wherein the studs are circular in a plane parallel to the face of the cathode.

31. An apparatus according to claim 1, wherein the cathode is rotatable about a substantially vertical axis.

32. An apparatus according to claim 1, wherein the cathode is a circular disk having a bottom surface, a top surface and a peripheral surface.

33. An apparatus according to claim 1, wherein the cathode is movable in a direction parallel to its axis of rotation.

34. An apparatus according to claim 1, wherein the non-sacrificial anode is movable in a direction parallel to the axis of rotation of the cathode.

35. An apparatus according to claim 1, wherein the cathode has a shaft and the shaft is rotatably connected to the non-sacrificial anode.

36. An apparatus according to claim 35, wherein the cathode shaft is rotatably connected to the non-sacrificial anode by a connector located within the reaction vessel.

37. An apparatus according to claim 35, wherein the cathode shaft is rotatably connected to the non-sacrificial anode by a connector located outside the reaction vessel.

38. An apparatus according to claim 1, further comprising power source means for applying the first voltage and the second voltage.

39. An apparatus according to claim 1, wherein the first voltage is greater than the second voltage.

40. An apparatus according to claim 1, wherein the first voltage is equal to the second voltage.

41. An apparatus according to claim 1, wherein the first voltage is less than the second voltage.

42. An apparatus according to claim 1, further comprising an electrolyte source for adding electrolyte to the water to be treated.

43. An apparatus according to claim 42, wherein the electrolyte is sodium chloride.

44. An apparatus according to claim 1, further comprising a hydrogen peroxide source for adding hydrogen peroxide to the water to be treated.

45. An apparatus according to claim 1, further comprising a flocculant source for adding flocculant to the water exiting the reaction vessel.

46. An apparatus according to claim 1, further comprising a coagulant source for adding coagulant to the water exiting the reaction vessel.

47. An apparatus according to claim 1, wherein at least a portion of the non-sacrificial anode is coated with $TiO_2$.

48. An apparatus according to claim 1, wherein at least a portion of the cathode is coated with $TiO_2$.

49. An apparatus according to claim 1, wherein the reaction vessel is closed to the atmosphere.

* * * * *